United States Patent
He et al.

(10) Patent No.: US 9,201,871 B2
(45) Date of Patent: Dec. 1, 2015

(54) JOINT OPTIMIZATION FOR MACHINE TRANSLATION SYSTEM COMBINATION

(75) Inventors: Xiaodong He, Issaquah, WA (US); Kristina Toutanova, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 885 days.

(21) Appl. No.: 12/814,422

(22) Filed: Jun. 11, 2010

(65) Prior Publication Data

US 2011/0307244 A1 Dec. 15, 2011

(51) Int. Cl.
*G06F 17/20* (2006.01)
*G06F 17/28* (2006.01)

(52) U.S. Cl.
CPC ........ *G06F 17/2854* (2013.01); *G06F 17/2818* (2013.01); *G06F 17/2827* (2013.01)

(58) Field of Classification Search
CPC . G06F 17/28; G06F 17/2818; G06F 17/2827; G06F 17/2836; G06F 17/2809; G06F 17/2845; G06F 17/2854; G06F 17/2863; G06F 17/2872; G06F 17/289; G06F 17/2881
USPC .......................................... 704/2–8; 715/264
See application file for complete search history.

(56) References Cited

U.S. PATENT DOCUMENTS

| | | | |
|---|---|---|---|
| 7,505,894 B2 | 3/2009 | Menezes et al. | |
| 7,680,647 B2 | 3/2010 | Moore | |
| 8,326,598 B1 * | 12/2012 | Macherey et al. | 704/4 |
| 2006/0241934 A1 * | 10/2006 | Izuha | 704/2 |
| 2007/0010989 A1 * | 1/2007 | Faruquie et al. | 704/2 |
| 2007/0083357 A1 * | 4/2007 | Moore et al. | 704/4 |
| 2008/0120091 A1 * | 5/2008 | Waibel et al. | 704/2 |
| 2009/0112573 A1 | 4/2009 | He | |
| 2009/0240486 A1 * | 9/2009 | He et al. | 704/3 |
| 2009/0299724 A1 * | 12/2009 | Deng et al. | 704/2 |
| 2009/0326916 A1 * | 12/2009 | Gao et al. | 704/4 |
| 2010/0004920 A1 | 1/2010 | Macherey et al. | |
| 2010/0023315 A1 | 1/2010 | Quirk et al. | |
| 2010/0057437 A1 | 3/2010 | Yin et al. | |
| 2010/0070263 A1 * | 3/2010 | Goto et al. | 704/8 |
| 2010/0138213 A1 * | 6/2010 | Bicici et al. | 704/4 |
| 2010/0179803 A1 * | 7/2010 | Sawaf et al. | 704/2 |
| 2011/0178791 A1 * | 7/2011 | Stymne et al. | 704/2 |

OTHER PUBLICATIONS

Rosti et al., Incremental Hypothesis Alignment for Building Confusion Networks with Application to Machine Translation System Combination, 2009, ACL, Proceedings of the Third Workshop on Statistical Machine Translation, pp. 183-186.*

Matsuv et al., Computing Consensus Translation from Multiple Machine Translation Systems Using Enhanced Hypotheses Alignment, 2006, EACL, pp. 1-8.*

(Continued)

*Primary Examiner* — Lamont Spooner
(74) *Attorney, Agent, or Firm* — Alin Corie; Sandy Swain; Micky Minhas

(57) ABSTRACT

A joint optimization strategy is employed for combining translation hypotheses from multiple machine-translation systems. Decisions on word alignment, between the hypotheses, ordering, and selection of a combined translation output are made jointly in accordance with a set of features. Additional features that model alignment and ordering behavior are also provided and utilized.

20 Claims, 11 Drawing Sheets

(56) References Cited

OTHER PUBLICATIONS

Yang Feng, Yang Liu, Haitaomi, Qun Liu, Yajuan Lu. Lattice-based System Combination for Statistical Machine Translation—Published Date: Aug. 7, 2009 http://www.aclweb.org/anthology/D/D09-1115.pdf.

Kenneth Heafield, Greg Hanneman, Alon Lavie. Machine Translation System Combination with Flexible Word Ordering—Published Date: Mar. 31, 2009 http://www.statmt.org/wmt09/pdf/WMT-0908.pdf.

Almut Silja Hildebrand and Stephan Vogel. Combination of Machine Translation Systems via Hypothesis Selection from Combined N-best Lists—Published Date: Oct. 25, 2008 http://www.mt-archive.info/AMTA-2008-Hildebrand.pdf.

Fei Huang and Kishore Papineni. Hierarchical System Combination for Machine Translation—Published Date: Jun. 2007 http://acl.ldc.upenn.edu/D/D07/D07-1029.pdf.

Srinivas Bangalore, German Bordel, and Giuseppe Riccardi. Computing consensus translation from multiple machine translation systems. In Proceedings of IEEE ASRU—Published Date: 2001.

Xiaodong He, Mei Yang, Jianfeng Gao, Patrick Nguyen, and Robert Moore. Indirect HMM based Hypothesis Alignment for Combining Outputs from Machine Translation Systems. In Proceedings of EMNLP—Published Date: 2008.

Shyamsundar Jayaraman and Alon Lavie. Multi-engine machine translation guided by explicit word matching. In Proceedings of EAMT—Published Date: Jun. 2005.

Damianos Karakos, Jason Eisner, Sanjeev Khudanpur, and Markus Dreyer Machine Translation System Combination using ITG-based Alignments. In Proceedings of ACL—Published Date: Jun. 2008.

Philipp Koehn Statistical Significance Tests for Machine Translation Evaluation. In Proceedings of EMNLP—Published Date: 2004.

Philipp Koehn Pharaoh: A Beam Search Decoder For Phrase Based Statistical Machine Translation Models. In Proceedings of AMTA—Published Date: 2004.

Chi-Ho Li, Xiaodong He, Yupeng Liu and Ning Xi, Incremental HMM Alignment for MT System Combination. In Proceedings of ACL—Published Date: Aug. 2009.

Evgeny Matusov, Nicola Ueffing and Hermann Ney. Computing Consensus Translation from Multiple Machine Translation Systems using Enhanced Hypothesis Alignment. In Proceedings of EACL—Published Date: 2006.

Evgeny Matusov, Gregor Leusch, Rafael E. Banchs, Nicola Bertoldi, Daniel Déchelotte, Marcello Federico, Muntsin Kolss, Young-Suk Lee, José B. Mariño, Matthias Paulik, Salim Roukos, Holger Schwenk, and Hermann Ney. System combination for machine translation of spoken and written language. IEEE transactions on audio speech and language processing 16(7)—Published Date: Sep. 2008.

Robert C. Moore and Chris Quirk. Random Restarts in Minimum Error Rate Training for Statistical Machine Translation, In Proceedings of COLING—Published Date: Aug. 2008.

Robert C. Moore. Improving IBM Word Alignment Model 1, In Proceedings of ACL—Published Date: 2004.

NIST. The NIST Open Machine Translation Evaluation. www.nist.gov/speech/tests/mt/2008/doc/—Published Dated: Mar. 2008.

Franz J. Och. Minimum Error Rate Training in Statistical Machine Translation. In Proceedings of ACL—Published Date: Jul. 2003.

Kishore Papineni, Salim Roukos, Todd Ward and Wei- Jing Zhu. BLEU: a Method for Automatic Evaluation of Machine Translation. In Proceedings of ACL—Published Date: Jul. 2002.

Antti-Veikko I. Rosti, Bing Xiang, Spyros Matsoukas, Richard Schwartz, Necip Fazil Ayan, and Bonnie J. Dorr. Combining outputs from multiple machine translation systems. In Proceedings of NAACL-HLT—Published Date: 2007.

Antti-Veikko I. Rosti, Spyros Matsoukas, and Richard Schwartz. Improved Word-level System Combination for Machine Translation. In Proceedings of ACL—Published Date: Jun. 2007.

Antti-Veikko I. Rosti, Bing Zhang, Spyros Matsoukas, and Richard Schwartz. Incremental Hypothesis Alignment for Building Confusion Networks with Application to Machine Translation System Combination. In Proceedings of the 3rd ACL Workshop on SMT—Published Date: Jun. 2008.

Yong Zhao and Xiaodong He. Using N-gram based Features for Machine Translation System Combination. In Proceedings of NAACL-HTL—Published Date: Jun. 2009.

Liang et al., "Alignment by Agreement," Proceedings of the Human Language Technology Conference of the North American Chapter of the ACL, Jun. 2006, pp. 104-111, Association for Computational Linguistics.

* cited by examiner

JOINT OPTIMIZATION FOR MACHINE TRANSLATION SYSTEM COMBINATION

BACKGROUND

Machine translation (MT) refers to the use of a machine or more particularly a computer, to produce translations from one natural language to another with or without human intervention. Generally, the translation process includes two steps, namely decoding the meaning of text or speech in a source language and re-encoding the meaning in a target language. Behind this ostensibly simple process, however, are complex operations aimed at extracting and preserving meaning in light of semantic ambiguity, syntactic complexity, and vocabulary differences between languages, among other things. Numerous MT systems exist today that utilize a variety of approaches to produce translations.

Moreover, system combination for machine translation has emerged as a powerful method of combining the strengths of multiple MT systems and achieving results that surpass those of each individual system. Most state-of-the-art system-combination methods are based on constructing a confusion network (CN) from several input translation hypotheses (output of MT systems), and choosing the best output from the CN based on several scoring functions.

The general idea behind confusion-network-based system combination is to combine hypotheses in a representation where for each word there is a set of possible words shown in columns (an alternative representation of a directed acyclic graph), as provided in the below exemplary table:

TABLE 1

| she | bought | the | Jeep | $\epsilon$ |
| she | buys | the | SUV | $\epsilon$ |
| she | bought | the | SUV | Jeep |

The final output is determined by choosing one word from each column, which can be a real word or the empty word "$\epsilon$." In the example above, eight distinct sequences of words can be generated including: "she bought the Jeep" and "she bought the SUV Jeep." The choice is performed to maximize a scoring function using a set of features and a log-linear model.

A confusion network can be viewed as an ordered sequence of columns or, in other words, correspondence sets. Each word from each input hypothesis belongs to one correspondence set. Each correspondence set includes at most one word from each input hypothesis and contributes one of its words (including the possible empty word) to the final output, and final words are output in the order of correspondence sets. In order to construct such a representation two sub-problems need to be solved, namely the alignment problem and ordering problem. The alignment problem pertains to arranging words from all input hypotheses into correspondence sets, and the ordering problem concerns ordering correspondence sets. After constructing the CN, there is a third sub-problem, the lexical selection problem, wherein a determination is made as to which words to output from each correspondence set.

Conventionally, construction of the CN is performed as follows. First, a backbone hypothesis is selected, which determines the order of words in the final system output, and guides word-level alignments for construction of columns of possible words at each position. For example, assume that there are three hypotheses: "she bought the Jeep," "she buys the SUV," and "she bought the SUV Jeep," and the second hypothesis, "she buys the SUV" is selected as the backbone. The other two hypotheses are aligned to the backbone such that these alignments are one-to-one, and empty words are inserted, if needed, to make one-to-one alignment possible. Words in the hypotheses are sorted by position of the backbone word they align to and the confusion network is determined, for example, as depicted in TABLE 1.

It is clear that the quality of selection of the backbone and alignments has a large impact on performance, because the word order is determined by the backbone, and the set of possible words at each position is determined by alignment. Since the space of possible alignments is extremely large, approximate and heuristic techniques have been employed to derive them. In pair-wise alignment models, for example, each hypothesis is aligned to the backbone in turn, with separate processing to combine the multiple alignments. A major problem with such methods is that each hypothesis is aligned to the backbone independently, leading to sub-optimal behavior.

For example, suppose that a state-of-the-art word alignment model is employed for pairs of hypotheses as provided above. If the first hypothesis is aligned to the second hypothesis (the backbone), "Jeep" is likely to align to "SUV" because they express similar content. The third hypothesis is separately aligned to the backbone, and since the alignment is constrained to be one-to-one, "SUV" is aligned to "SUV" and "Jeep" to an empty word, which is inserted after "SUV." The confusion network represented in TABLE 1 is a result of this process. An undesirable property of this CN is that two instances of the word "Jeep" are in separate columns, and thus they cannot vote to reinforce each other.

Incremental methods have been proposed to relax the independence assumption of pair-wise alignment. Such methods align hypotheses to a partially constructed CN in some order. For example, in such a method the third hypothesis is first aligned to the backbone followed by alignment of the first hypothesis. It is likely that the following CN will be produced as a result of this alignment:

TABLE 2

| she | bought | the | $\epsilon$ | Jeep |
| she | buys | the | SUV | $\epsilon$ |
| she | bought | the | SUV | Jeep |

Here, the two instances of "Jeep" are aligned. However, if the first hypothesis is aligned to the backbone first, the CN provided in TABLE 1 results. Further, if the desired output is "she bought the Jeep SUV," the output cannot be generated from either confusion network because a re-ordering would be required with respect to the original input hypotheses.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally concerns joint optimization for machine translation system combination. More specifically, decisions on word alignment between input hypotheses, correspondence set ordering, and word selection can be made jointly according to a set of features. Additionally, features are disclosed and employed that measure alignment confidence by way of an alignment model and evaluate ordering by way of a distortion model. Stated differently, the three sub-problems of word-level system combination are solved jointly, alignments between words of different hypotheses are not predetermined, and flexible ordering is allowed.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward joint optimization for machine-translation system combination. Combining output from multiple machine translation systems (e.g., translation hypotheses) involves three sub-problems, namely alignment, ordering, and lexical selection of a combined translation output. Alignment concerns arranging words from input hypotheses into correspondence sets. Ordering relates to ordering the correspondence sets, and lexical selection pertains to choosing words to output from each of the correspondence sets. Conventionally, decisions with respect to each of these sub-problems have been made independent of the others. As a result, many sub-optimal local decisions are made.

In accordance with one aspect of this disclosure, decisions on word alignment, ordering, and selection are made jointly in accordance with a set of features, for example as part of a decoding process. In this manner, alignment, ordering, and selection can be optimized. Further, unlike conventional approaches, alignments between words from different hypotheses are not pre-determined, and flexible word ordering is allowed. Further yet, features for optimally modeling alignment and ordering are disclosed and employed.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
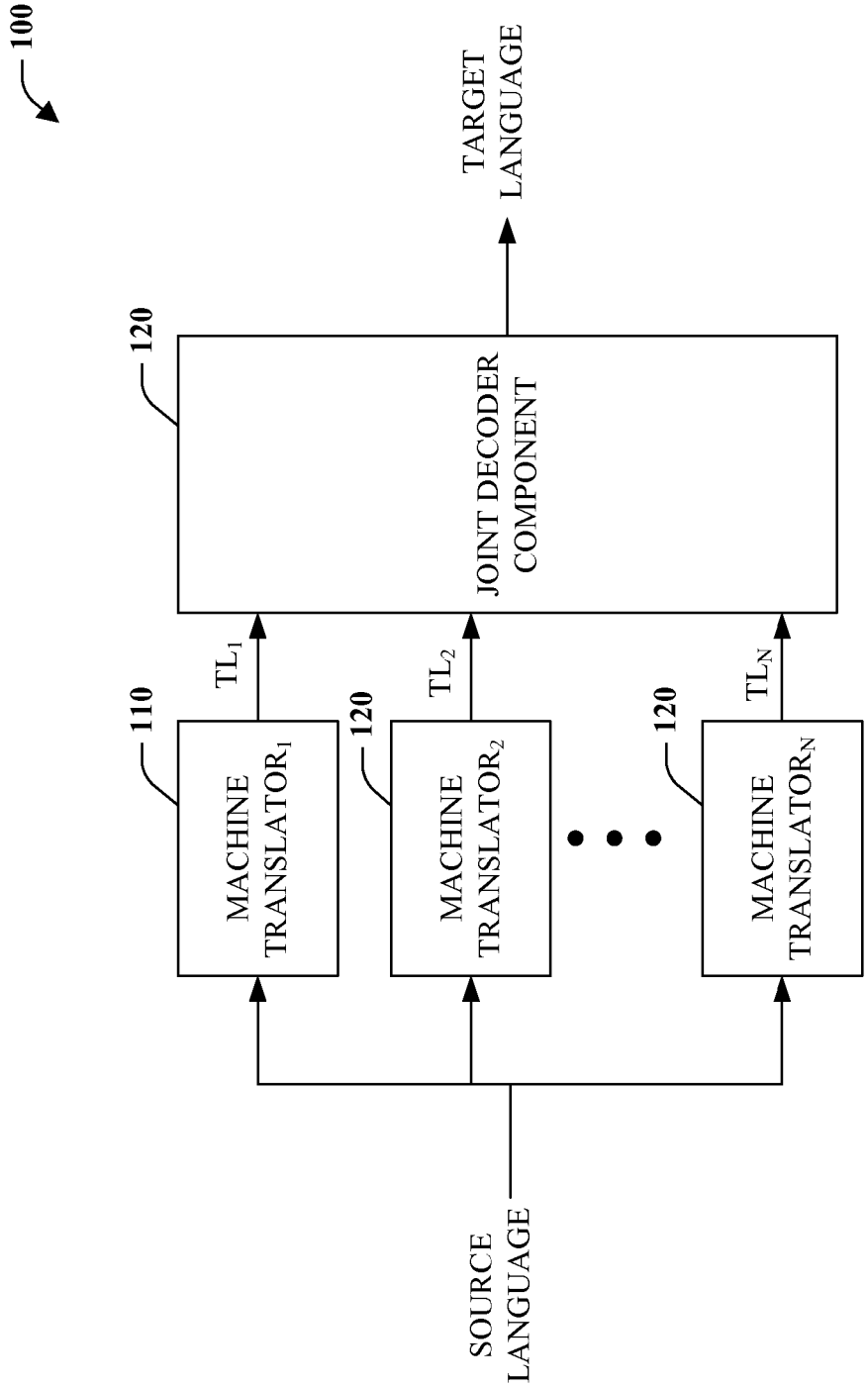
FIG. 1 is a block diagram of a machine translation system.

Referring initially to FIG. 1, machine translation system 100 is illustrated that employs joint optimization for system combination. A source language sentence can be translated into a target language sentence by a plurality of machine translator/translation systems or components 110 (MACHINE TRANSLATOR$_1$-MACHINE TRANSLATOR$_N$, wherein N is an integer greater than one). Additionally, one or more of the plurality of machine translator components 110 can output a set of n-best (n is an integer great than one) translations rather than a single translation. The outputs of the machine translator components 110 (TL$_1$(Translation$_1$)-TL$_N$(Translation$_N$), wherein N is an integer greater than one) can be provided to a joint decoder component 120. For the joint decoder component 120, outputs of the machine translator components 110 are inputs that represent potential translations or in other words, hypotheses. From these hypotheses, the joint decoder component 120 generates and outputs a target language translation or, in other words, a combined translation output (also referred to herein as a final output).

Similar to conventional technology, the joint decoder component 120 makes decisions regarding, word alignment, ordering, and selection. Unlike conventional technology, however, alignment between words is not predetermined and flexible word ordering is allowed. Furthermore, the joint decoder component 120 makes the decisions jointly rather than making sub-optimal local decisions (e.g., backbone selection, sub-optimal-score functions and heuristics, limited lexical choice . . . ). Stated differently, instead of performing word alignment, ordering, and selection independent of one another, these actions can be performed jointly to facilitate generation of a better combined-translation output than is otherwise possible with conventional confusion-network-based techniques, among others. In accordance with one particular embodiment, the joint decoder component 120 can combine the outputs from the plurality of machine translator components 110 according to a set of feature functions combined in a log-linear model, as described further below.

Figure 2:
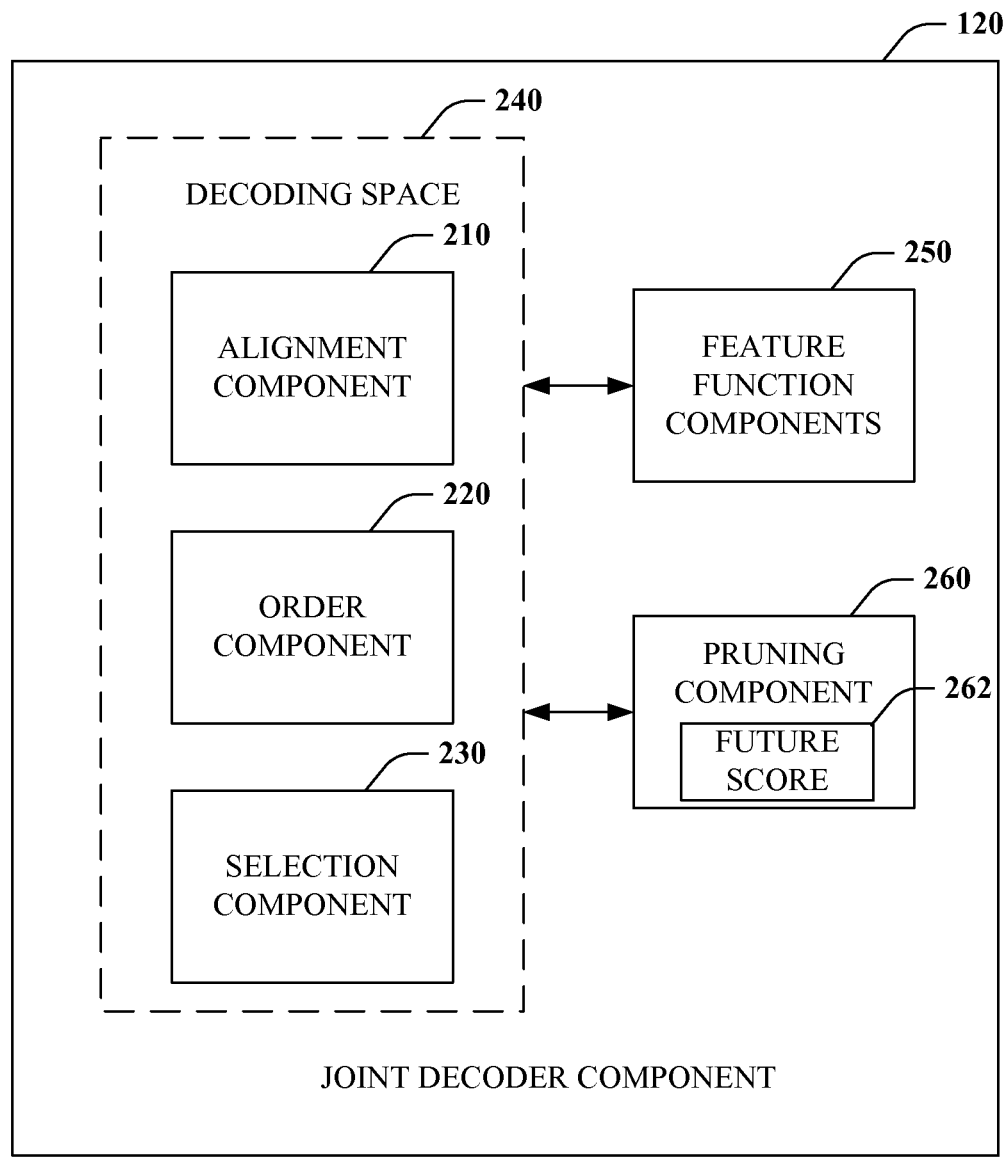
FIG. 2 is a block diagram of a representative joint decoder component.

FIG. 2 depicts a representative joint decoder component 120 in further detail. As shown, the representative joint decoder component 120 includes an alignment component 210, an order component 220, and a selection component 230. The alignment component 210 arranges words from input hypotheses into correspondence sets, and the order component 220 orders the correspondence sets. The selection component 230 selects one word from each correspondence set to produce a combined translation output. Together the alignment component 210, order component 220, and selection component 230 form a decoding space 240 (also referred to herein as a search space). Furthermore, the functionality provided by the alignment component 210, order component 220, and selection component 230 need not be performed serially or incrementally but rather can be performed jointly utilizing a plurality of feature function components 250.

Feature function components 250 (also referred to herein as feature functions or simply features) generate scores between input and output. By way of example and not limitation, a score can express a probability of an input and/or output or, in other words, a confidence level in an input and/or output (e.g., probability between an input and an output, probability of an input given an output, probability of an output itself . . . ). Here, the feature function components 250 that model one or more of alignment, ordering, or selection can be employed. Moreover, the globally highest scoring combination of alignment, ordering, and selection can be chosen by the joint decoder component 120.

The decoding space 240 is a product of alignment, ordering, and selection spaces, and its size is exponential in the length of sentences and the number of hypotheses involved in combination. The pruning component 260 can prune or, in other words, reduce the decoding space 240. For example, instead of allowing any alignment link between arbitrary words of two hypotheses, links can be limited to those that have an alignment score greater than a threshold. Further, the ordering space can be pruned by limiting expansion of new states in some way. Still further yet, the decoding space 240 can be limited utilizing a technique of path recombination and best-first pruning. Future score component 262 can employ various technologies to estimate future score or cost of an unfinished path to facilitate at least best-first pruning.

Figure 3:
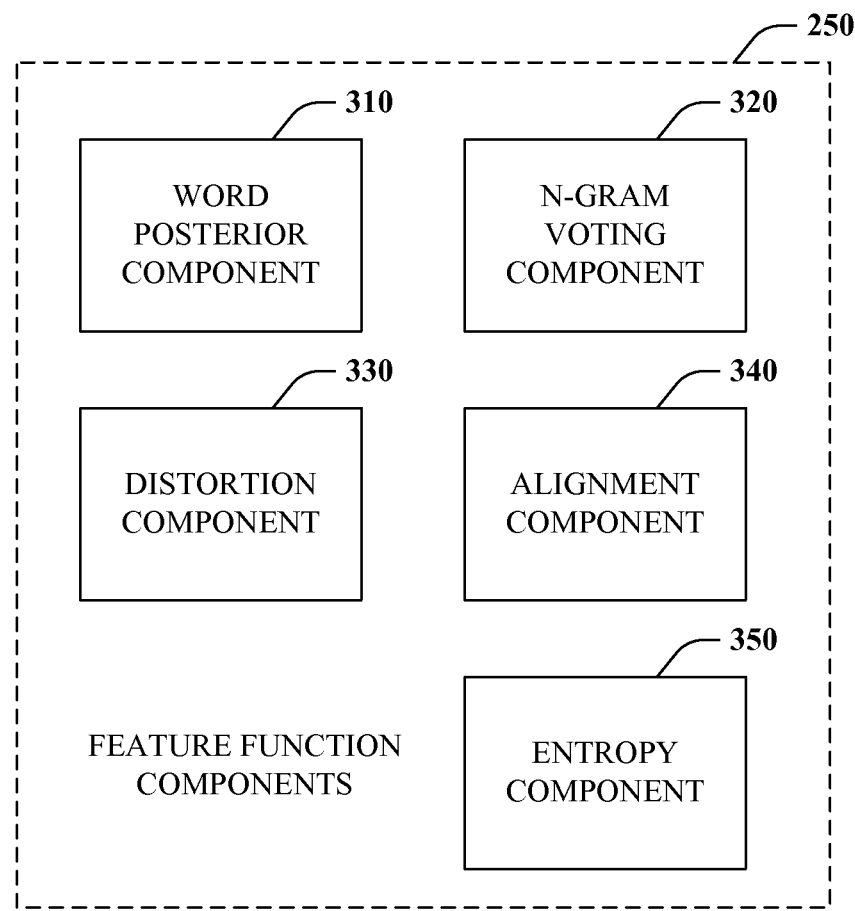
FIG. 3 is a block diagram of a plurality of representative feature-function components.

Turning attention to FIG. 3 a plurality of representative feature function components 250 are depicted that can be employed by a joint decoder component 120, namely word posterior component 310, n-gram voting component 320, distortion component 330, alignment component 340 and entropy component 350. The word posterior component 310 and n-gram voting component 320 provide scoring related to word selection from correspondence sets.

The word posterior component 310 provides a position dependent weight or score to facilitate identification of, or voting for, the most prevalent or majority word. For instance, if a correspondence set includes "Jeep," "SUV," and "SUV," "SUV" would be scored higher than "Jeep" because it is the most prevalent word in the set. Stated differently, "SUV" has two votes to one vote for "Jeep."

The n-gram voting component 320 computes a similar word scoring as the word posterior component 310, but is position independent and takes into account the history of word selection (e.g., n previous words). For example, if a correspondence set includes "Jeep," "SUV," and "SUV," and "SUV" was previously selected, the score for "SUV" can be reduced, potentially, but not necessarily, resulting in selection of "Jeep."

The distortion component 330 generates a score or more specifically a distortion penalty with respect to different or inconsistent correspondence set orders, for example between correspondence sets and output of multiple translation systems. Stated differently, the distortion component 330 measures the consistency of correspondence set orders. For instance, consider two correspondence sets that capture three hypotheses of two words each, namely "Jeep SUV," "SUV Jeep," and "SUV Jeep." There are two different orderings of words, and accordingly distortion component 300 can assess a penalty associated with each of the orderings. In one instance, a greater penalty can be associated with "Jeep SUV" since it is in the minority, while "SUV Jeep" can be penalized less.

To provide further clarity with respect to the difference between distortion penalty and n-gram voting, for example, consider the following example. Suppose there are three hypotheses each with a word in a first position and a second position, for instance "A1 B1," "B2 A2," and "B3 A3," and due to an alignment score threshold two correspondence sets are allowed, namely "{A1 A2 A3}," and "{B1 B2 B3}." If the order at position one is "{A1 A2 A3}" and the order at position two is "{B1 B2 B3}," the penalty would be higher than ordering the correspondence sets as "{B1 B2 B3}" in the first position and "{A1 A2 A3}" in the second position, because compared to the original order of the hypotheses "A1->B1/B2->A2/B3->A3" the former is in the minority. This is unlike n-gram voting since "A1," A2," "A3," "B1," B2," and "B3 can represent different words and as such not impact voting.

The alignment component 340 and entropy component 350 both produce scores related to that alignment of words into correspondence sets. The alignment component 340 produces scores that measure the quality of alignment amongst words, for example utilizing an indirect hidden Markov model (IHMM) wherein parameters relate to semantic and surface word similarity, among other things. The entropy component 350 generates scores pertaining to the purity of a correspondence set. Ideally, all words in a correspondence set would be the same. However, different words can be present in a correspondence set and the entropy component 350 captures as a score correspondence-set purity or in other words likeness and/or differentness of words in a correspondence set.

Returning briefly to FIG. 2, the joint decoder component 120, in one embodiment, can execute a beam search algorithm to perform core functionality. The input can be a set of translation hypotheses to be combined, and the output sentence can be generated from left to right.

Figure 4:
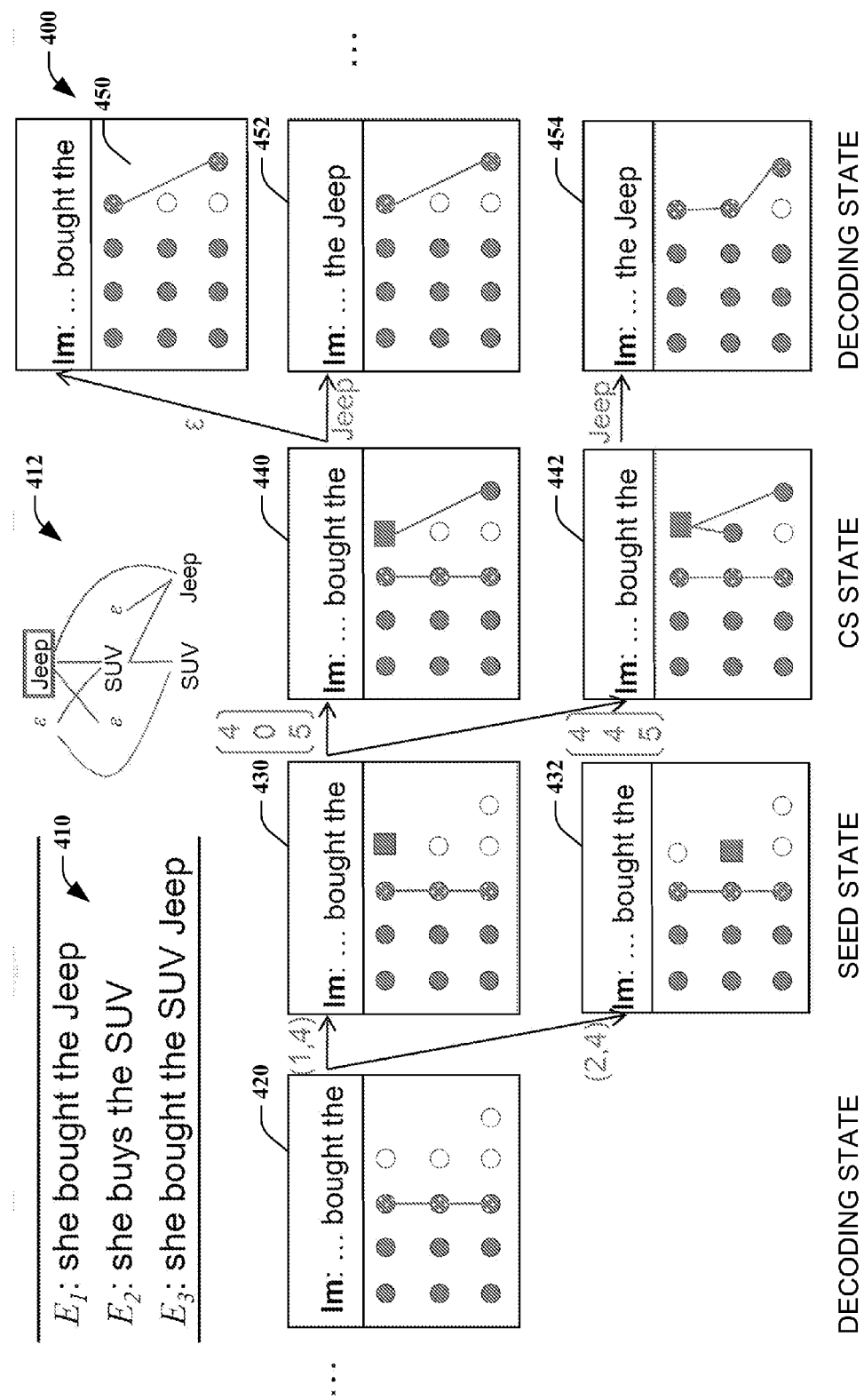
FIG. 4 depicts an exemplary joint decoding process.

FIG. 4 depicts an exemplary decoding process 400 that can be performed by the joint decoder component 120. The input is the three hypotheses presented in TABLE 1 and reproduced at numeral 410 for convenient reference ("She bought the Jeep," "She buys the SUV," and "She bought the SUV Jeep"). Each decoding state represents a partial sequence of correspondence sets covering some of the words in the input hypotheses and a sequence of words selected from the CS to form a partial output hypothesis. The initial decoding state can have an empty sequence of CS and an empty output sequence. A state corresponds to a complete output candidate if its CS covers all input words.

In practice, a large amount of information need not be encoded in a decoding state. Rather, it suffices to store a few attributes. They include positions of words from each input hypothesis that have been visited, the last two non-empty words generated (e.g., if a tri-gram LM is used), and an "end position vector (EPV)" recording positions of words in the last CS that were just visited. In FIG. 4, the visited words are shown with filled circles and the EPV is shown with a dotted pattern in the filled circles. Words specified by the EPV are implicitly aligned. In the first decoding state 420, the first three words of each hypothesis have been visited, the third word of each hypothesis is the last word visited (in the EPV), and the last two words produced are "bought the." The states can also record the decoding score accumulated so far and an estimated future score to cover words that have not been visited yet (not shown).

The expansion from one decoding state to a set of new decoding states is illustrated. The expansion is done in three steps with the help of intermediate states. Starting from the first decoding state 420, a set of seed states are generated, namely first seed state 430 and second seed state 432. Each seed state represents a choice of one of unvisited words, called a "seed word" which is selected and marked as visited, as shown. For example, the word "Jeep" from the first hypothesis and the word "SUV" from the second hypothesis are selected in the first seed state 430 and the second seed state 432, respectively. These seed states further expand into a set of CS states. That is, a CS is formed by picking one word from each of the other hypotheses, which is unvisited and has a valid alignment link to the seed word. As illustrated, two CS states 440 and 442 are expanded from the first seed state 430, using "Jeep" from the first hypothesis as a seed word. In one of them, the empty word from the second hypothesis is chosen, and in the other, the word "SUV" is chosen. Both are allowed by the alignments graphically illustrated at 412. Finally, each CS state 440 and 442 generates one or more complete decoding states, in which a word is chosen from the current CS and the EPV vector is advanced to reflect the last newly visited words. FIG. 4 shows three decoding states 450, 452, and 454, descending from the corresponding CS states in 440 and 442. After one more expansion from decoding state 454 (not shown), the translation "She bought the Jeep SUV" is generated, which cannot be produced by either conventional confusion network as shown in TABLE 1 and TABLE 2.

Further detail regarding functionality of previously described systems and components is provided below in a more formalistic manner. The details are meant to clarify functionality and provide exemplary implementations and not to implicitly or impliedly limit the scope of the appended claims. A notation is provided next to aid understanding of the description that follows.

A set of hypotheses from multiple machine translator systems or components is denoted "$H=\{h_1, \ldots, h_N\}$," where "$h_i$" is the hypothesis from the $i^{th}$ system and "$h_i$" is a word sequence "$w_{i,1}, \ldots, w_{i,L(i)}$" with length "L(i)." For simplicity, it is assumed that each system contributes its top-rated hypothesis for combination. Accordingly, the $i^{th}$ hypothesis "$h_i$" will be associated with a weight "W(i)," which is the weight of the $i^{th}$ system. In the scenario that N-best lists are available from individual systems for combination, the weight of each hypothesis can be computed based on its rank in the N-best list.

Similar to confusion network based combination, a set of ordered correspondence sets (CS) can be constructed from input hypotheses, and one word from each CS can be selected to form the final output. A CS is defined as a set of (possibly empty) words, one from each hypothesis, that implicitly align to each other and that contributes exactly one of its words to the final output. A valid complete set of CS includes each non-empty word from each hypothesis in exactly one CS. As opposed to confusion network based approaches, here ordered correspondence sets are constructed during a joint decoding process, which performs selection at substantially the same time.

To facilitate presentation of particular feature, a notation for order CS is defined. A sequence of correspondence sets is denoted by "$C=CS_1, \ldots, CS_M$." Each correspondence set is specified by listing the positions of each of the words in the CS in their respective input hypotheses. Each input hypothesis is assumed to have one special empty word "$\epsilon$" at position zero. A CS is denoted by "$CS(l_1, \ldots, l_N) = \{w_{1,l_1}, \ldots, w_{N,l_N}\}$," where $w_{i,l_i}^{th}$ is the $l_i^{th}$ word in the $i^{th}$ hypothesis, and the word position vector "$v=[l_1, \ldots, l_N]^T$" specifies the position of each word in its original hypothesis. Correspondingly, word "$w_{i,l_i}$" has the same weight "W(i)" as its original hypothesis "$h_i$." As an example, the last two correspondence sets specified by the CN shown in TABLE 1 would be specified as "$CS_4=CS(4,4,4)=\{Jeep, SUV, SUV\}$" and "$CS_5=CS(0,0,5)=\{\epsilon, \epsilon, Jeep\}$."

As opposed to the CS defined in a conventional CN, words that have the same surface form (e.g., part-of-speech, number, gender, tense . . . ) but come from different hypotheses need not be collapsed to be one single candidate since they have different original word positions. They can each be traced separately during the decoding process.

In accordance with one embodiment, the joint decoder component 120 can choose an optimal output according to the following log-linear model:

$$w^* = \underset{w \in W, O \in O, C \in C}{\operatorname{argmax}} \exp\left\{\sum_{i=1}^{F} \alpha_i \cdot f_i(w, O, C, H)\right\}$$

where "C" denotes the set of possible valid arrangements of CS, "O" specifies the set of possible orders of CS, and "W" denotes the set of possible word sequences, including words from the input hypotheses. "$\{f_i(w, O, C, H)\}$" are feature functions and "$\{\alpha_i\}$" are feature weights in the log-linear model, respectively.

As previously described, features or feature function components 250 can be utilized by the joint decoder component 120. Each of the features models one or more of alignment, ordering, or selection sub-problems. What follows are details relating to the word posterior component 310, n-gram voting component 320, distortion component 330, alignment component 340, and entropy component 350.

The word posterior feature can be implemented as follows:

$$f_{wp}(w, O, C, H) = \sum_{m=1}^{M} \log(P(w_m \mid CS_m))$$

where the posterior probability of a single word in a CS is computed based on a weighted voting score:

$$P(w_{i,l_i} \mid CS) = P(w_{i,l_i} \mid CS(l_1, \ldots, l_N))$$
$$= \sum_{k=1}^{N} W(k)\delta(w_{k,l_k} = w_{i,l_i}),$$

and "M" is the number of correspondence sets generated. Note that "M" may be larger than the length of the output word sequence "w" since some CS may generate empty words.

As per the n-gram voting feature, consider a bi-gram approach. Here, for each bi-gram "$<w_i, w_{i+1}>$", a weighted position-independent voting score computed can be computed as follows:

$$P(\langle w_i, w_{i+1} \rangle \mid H) = \sum_{k=1}^{N} W(k)\delta(\langle w_i, w_{i+1} \rangle \in h_i)$$

The global bi-gram voting feature can be defined as:

$$f_{bgv}(w, O, C, H) = \sum_{i=1}^{|w|-1} \log(P(\langle w_i, w_{i+1} \rangle \mid H))$$

Unlike in the conventional CN-based system combination, flexible orders of CS are allowed. In order to model the distortion of different orderings, a distortion model between two correspondence sets is defined as follows:

First, a distortion cost can be defined between two words at a single hypothesis. Similar to the distortion penalty in the conventional phrase-based decoder, the distortion cost of jumping from a word at position "i" to another word at position "j", "d(i, j)" is proportional to the distance between "i" and "j" (e.g., |i−j|). Then, the distortion cost of jumping from one CS, which has a position vector recording the original position of each word in that CS, to another CS is a weighted sum of single-hypothesis-based distortion costs:

$$d(CS_m, CS_{m+1}) = \sum_{k=1}^{N} W(k) \cdot |l_{m,k} - l_{m+1,k}|$$

where "$l_{m,k}$" and "$l_{m+1,k}$" are the $k^{th}$ element of the word position vector "$CS_m$" and "$CS_{m+1}$," respectively. For the purpose of computing distortion, the position of an empty word can be taken to be the same as the position of the last visited non-empty word from the same hypothesis.

The overall or global ordering feature can then be computed based on "$d(CS_m, CS_{m+1})$:"

$$f_{dis}(w, O, C, H) = -\sum_{m=1}^{M-1} d(CS_m, CS_{m+1})$$

It is worth noting that this need not be the only feature modeling ordering behavior. Other features such as the language model (LM) and n-gram voting, among other things, can affect ordering as well.

As per alignment, each CS consists of a set of words, one from each hypothesis, that can be implicitly aligned to each other. Therefore, a valid complete set of CS defines the word alignment among different hypotheses. An alignment score of a CS can be derived based on alignment scores of word pairs in that CS. To compute scores for word pairs, pair-wise hypothesis alignment can be performed using an indirect hidden Markov model (IHMM) for pairs of input hypotheses. This involves a total of "N" by "(N−1)/2" bi-directional hypothesis alignments. The alignment score for a pair of words "$w_{j,l_j}$" and "$w_{k,l_k}$" is defined as the average of posterior probabilities of alignment links in both directions and is thus direction independent:

$$p(w_{j,l_j}, w_{k,l_k}) = \tfrac{1}{2}(p(a_{l_j}=l_k|h_j, h_k) + p(a_{l_k}=l_j|h_k, h_j))$$

If one of the two words is "$\epsilon$," the posterior of aligning word "$\epsilon$" to state "j" can be computed i.e., $$p(a_0 = l_j | h_k, h_j) = \prod_{i=1}^{L(k)} (1 - p(a_i = l_j | h_k, h_j)),$$

and "$p(a_{l_j}=0|h_j, h_k)$" can be computed by the HMM directly.

If both words are "$\epsilon$," then a pre-defined "$p_{\epsilon\epsilon}$" is assigned, i.e., "$p(a_0=0|h_k,h_j)=p_{\epsilon\epsilon}$" where "$p_{\epsilon\epsilon}$" can be optimized on a held-out validation set.

For a CS of words, if the $j^{th}$ word is set as an anchor word, the probability that all other words align to that word is:

$$p(j|CS) = \prod_{\substack{k=1 \\ k \neq j}}^{N} p(w_{j,l_j}, w_{k,l_k})$$

The alignment score of the entire CS can be a weighted sum of the logarithm of the above alignment probabilities, i.e., $$S_{aln}(CS) = \sum_{j=1}^{N} W(j)\log(P(j|CS)),$$

and the global alignment score can be computed as:

$$f_{aln}(w, O, C, H) = \sum_{m=1}^{M} S_{aln}(CS_m)$$

Moving on to entropy, in general, it is preferable to align the same word from different hypotheses into a common CS. Therefore, entropy can be utilized to model the purity of a CS. The entropy of a CS can be defined as:

$$Ent(CS) = Ent(CS(l_1, \ldots, l_N)) = \sum_{i=1}^{N'} P(w_{i,l_i}|CS)\log P(w_{i,l_i}|CS)$$

where the sum is taken over all distinct words in the CS. Then, the global entropy score can be computed as:

$$f_{ent}(w, O, C, H) = \sum_{m=1}^{M} Ent(CS_m)$$

Other features can also be utilized in the log-linear model including the count of real words "|w|," an n-gram language model, and the count "M" of CS sets, among others.

The above and additional features can address one or more of the three sub-problems of MT system combination. By performing joint decoding with these features working together, better decisions can be derived on alignment, ordering, and selection.

As previously mentioned, pruning techniques can be employed to reduce a large search space. For example, the alignment space can be pruned by allowing links that have alignment scores higher than a threshold and links in the union of the Viterbi alignments in both directions. In order to prevent the garbage collection problem, where many words align to a rare word at the other side, further limits can be imposed such that if one word is aligned to more than "T" words, these links are sorted by their alignment score and only the top "T" links are kept. Meanwhile, alignments between a real word and "$\epsilon$" can be allowed.

The ordering space can be pruned down by limiting the expansion of new states. For instance, states that are adjacent to their preceding states can be created. Two states are called adjacent if their EPVs are adjacent. That is, given the EPV of the preceding state "m" as "$[l_{m,1}, \ldots, l_{m,N}]^T$" and the EPV of the next state "m+1" as "$[l_{m+1,1}, \ldots, l_{m+1,N}]$," if at least at one dimension "k," "$l_{m+1,k}=l_{m,k}+1$," then these two states are adjacent. When checking the adjacency of two states, the position of an empty word can be taken to be the same as the position of the last visited non-empty word from the same hypothesis.

The number of possible CS states expanded from a decoding state is exponential in the number of hypotheses. In decoding, these CS states can be sorted by their alignment scores and the top "K" CS states can be kept while others can be discarded.

The search space can be further pruned down by a technique of path recombination and by best-first pruning. Path recombination is a risk-free pruning method. Two paths can be recombined if they agree on a) words from each hypothesis that have been visited so far, b) the last two real words generated, and c) their EPVs. In such case, the path with the higher score can be kept while the other path can be discarded.

Best-first pruning can help to reduce the search space even further. In the decoding process, paths that have generated the same number of words (both real and empty words) can be compared and solely a predetermined number of most promising paths can be kept. Pruning is based on an estimated overall score of each path, which is the sum of the decoding score accumulated so far and an estimated future score to cover the words that have not been visited.

In order to estimate the future cost of an unfinished path, unvisited words of one input hypothesis can be treated as a backbone, and a greedy search applied for alignment based on the hypotheses. That is, for each word of this backbone, the most likely words (e.g., based on the alignment link scores) from other hypotheses, one word from each hypothesis, are collected to form a CS. These CS can be ordered according to the word order of the backbone and form a CN. Then, a light decoding process with a search beam of size one can be applied to decode this CN and find the approximate future path, with future feature scores computed during the decoding process. If there are leftover words not included in this CN, they are treated in the way described below. Additionally, caching techniques can be applied to speed up the computation of future scores further. Accordingly, a future score based on each input hypothesis, and the final future score is estimated as the best of these hypothesis-dependent scores.

At a certain point, a path will reach the end. In other words, no more states can be generated from it according to a state expansion requirement. At this point, the path is marked as a finished path. However, sometimes the state may include a few input words that have not been visited. An example of this situation is the decoding state 454 of FIG. 4. Here, the word "SUV" in the third input hypothesis is left unvisited and it is unable be selected next because there is no adjacent state that can be generated. For such cases, an extra score can be computed covering these leftover words. For example, a state can be created that produces the same output translation, but also covers remaining words. For each leftover word, a pseudo CS can be created that contains just that word plus empty words from all other hypotheses, and let it output and empty word. Moreover, that CS is inserted at a place such that no extra distortion cost is incurred.

Figure 5:
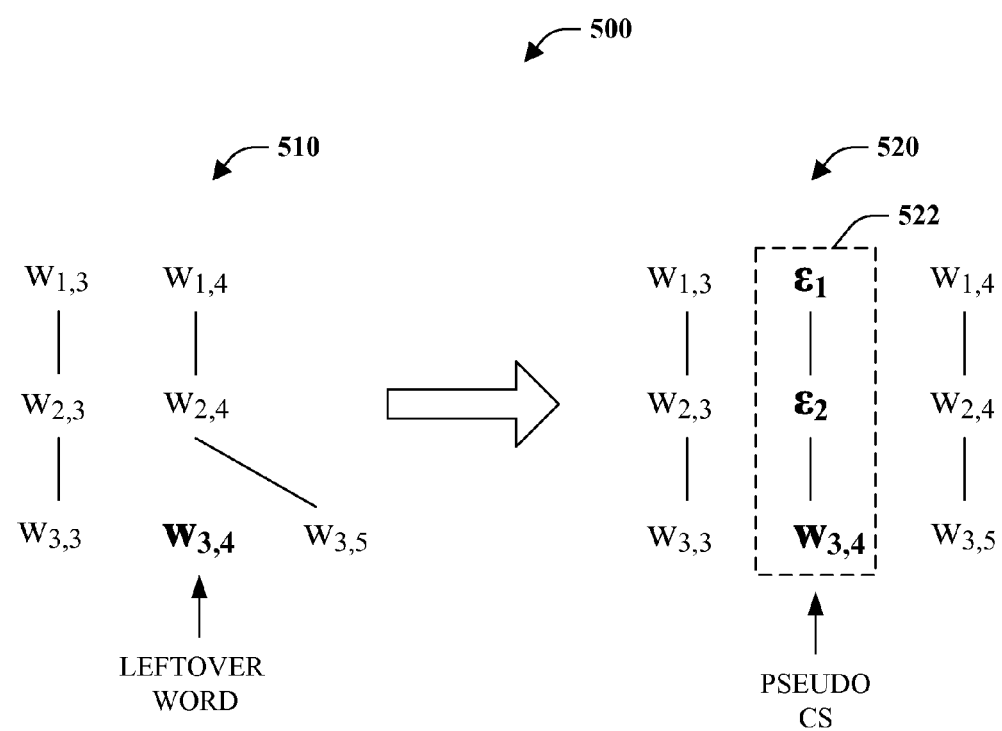
FIG. 5 illustrates expansion of a leftover word to a pseudo correspondence set.

FIG. 5 shows an example 500 using the decoding state 454 in FIG. 4. The last two words from the first two MT hypotheses "the Jeep" and "the SUV" align to the third and fifth words of the third hypothesis "the Jeep"; the word "$w_{3,4}$" from the third hypothesis, corresponding to "SUV," is left unvisited. The original path 510 has two correspondence sets and one leftover word "$w_{3,4}$." The original path 510 is expanded to generate a new path 520 that has three correspondence sets with a pseudo correspondence set 522 inserted between the two correspondence sets.

Note that the new inserted pseudo correspondence set 522 will not affect the word count feature and contextually dependent feature scores such as the LM and bi-gram voting, since it only generates an empty word. Moreover, it will not affect the distortion score either. For example, the distortion cost of jumping from word "$w_{2,3}$" to "$\epsilon_2$" and then to "$w_{2,4}$" is the same as the cost of jumping from "$w_{2,3}$" to "$w_{2,4}$" given the way position is assigned to empty word and that the distortion cost can be proportional to the difference between word positions.

Scores of other features for this pseudo CS 522 such as word posterior (of $\epsilon$), alignment score, CS entropy, and CS count are all local scores and can be computed easily. Unlike future scores, which are approximate, the score computed in this process is exact. Adding this extra score to the existing score accumulated in the final state gives the complete score of this finished path. When all paths are finished, the one with the top complete score can be returned as the final output sentence.

It is to be appreciated that various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the pruning component 260 and more particular future score component 262 can employ such mechanisms to determine or infer scores related to an unexplored path to facilitate optimal reduction of a decoding space.

In view of the exemplary systems described supra, methodologies that may be implemented in accordance with the disclosed subject matter will be better appreciated with reference to the flow charts of FIGS. 6-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 6:
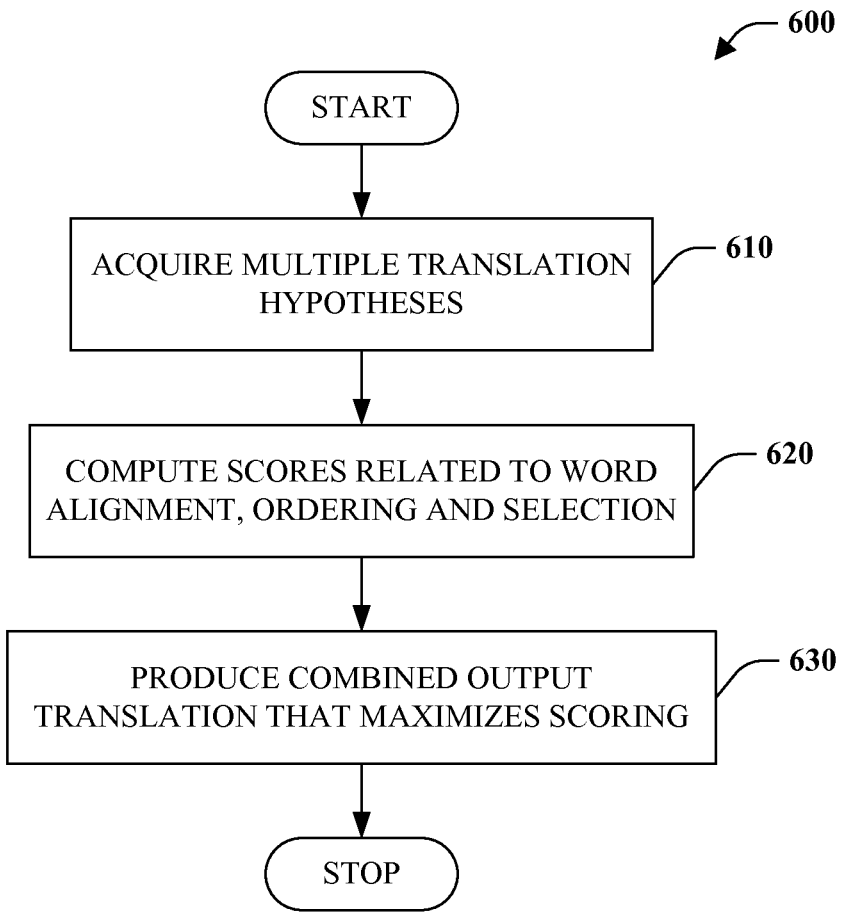
FIG. 6 is a flow chart diagram of a method of machine translation with system combination.

Referring to FIG. 6, a method 600 of machine translation with system combination is illustrated. At reference numeral 610, multiple translation hypotheses for a unit of translation, such as a sentence, are retrieved, or otherwise obtained or acquired. For example, these hypotheses can be output from multiple machine translation systems. At numeral 620, scores related to word alignment, ordering, and selection are computed. Such scores can be the result of one or more executed feature functions. At reference numeral 630, a combined output translation is produced that maximizes a scoring function. In this manner, the combined output translation is produced by a joint decoding process in which word alignment, ordering, and selection decisions are combined to produce an optimal result. In other words, method 600 is devoid of sub-optimal local decisions.

Figure 7:
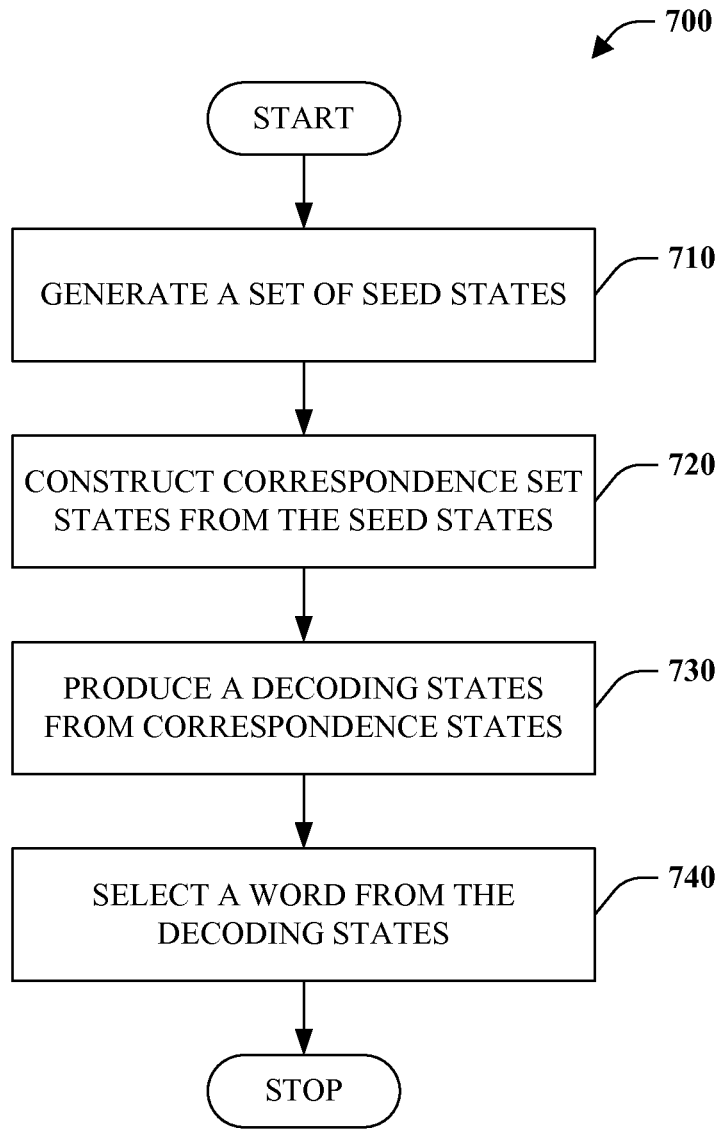
FIG. 7 is a flow chart diagram of a joint decoding method.

FIG. 7 is a flowchart diagram depicting an exemplary joint decoding method 700. At reference numeral 710, a set of seed states can be generated from a prior decoding state. Each decoding state represents a partial sequence of correspondence sets covering some of the words in input hypotheses and a sequence of words selected from the CS to form a partial output hypotheses. An initial decoding state includes an empty sequence of CS and an empty output sequence. The seed states represent identification of an un-visited word, called a seed word, which can be selected and marked as visited. At reference 720, one or more correspondence sets can be generated, or in other words expanded, from the seed states. That is, a CS can be formed by selecting one word from each other hypotheses, which is un-visited and has a valid alignment link to the seed word. At numeral 730, a decoding state is produced from each correspondence set, and, at reference 740, a word is selected from the decoding states. An end position indicator can also be advanced here to reflect the last CS that was visited to facilitate subsequent processing.

Figure 8:
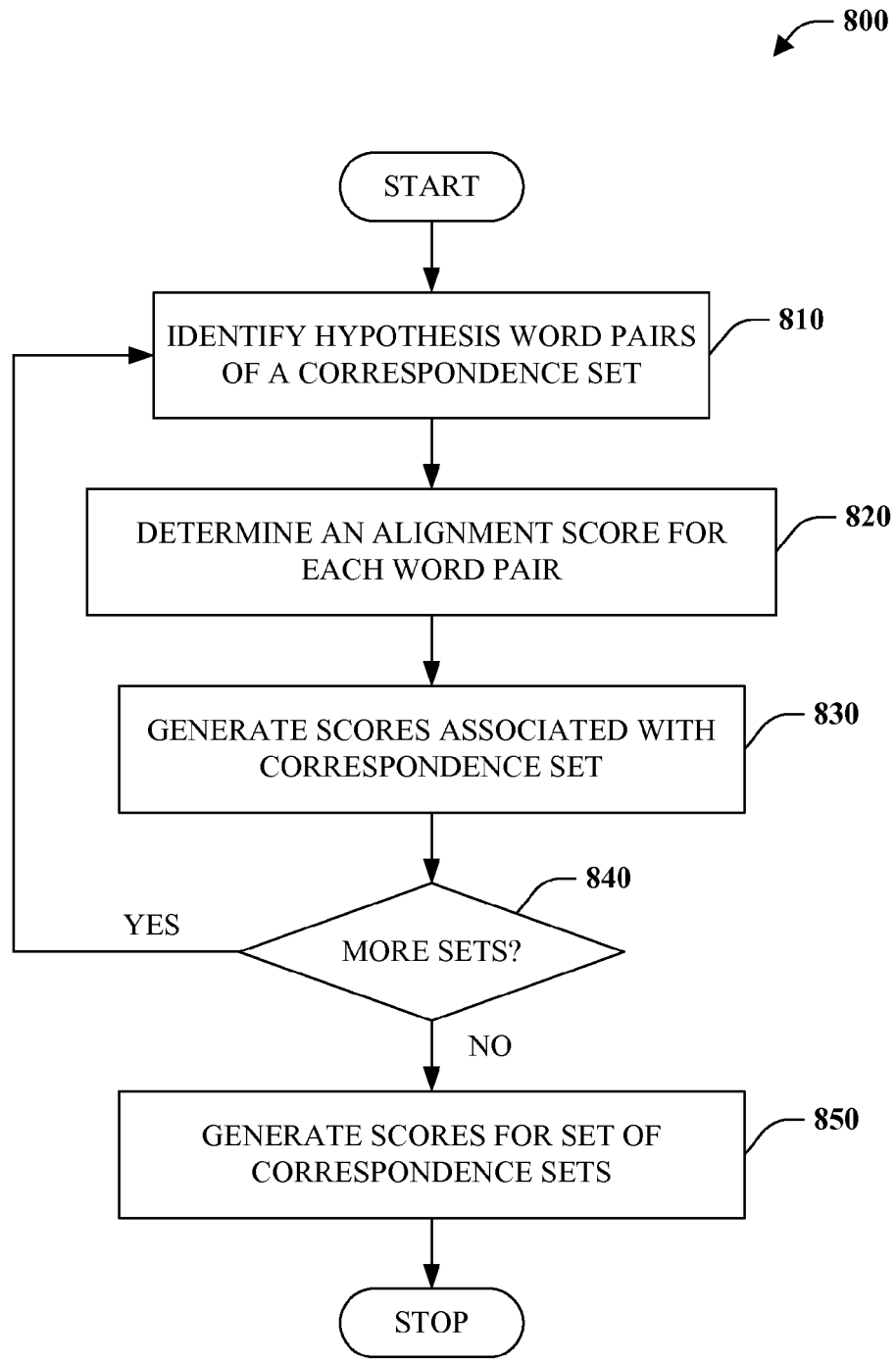
FIG. 8 is a flow chart diagram of a method of modeling alignment.

FIG. 8 illustrates a method of modeling alignment 800. At reference numeral 810, a pair of hypothesis words is identified from a correspondence set. At 820, an alignment score is determined for each pair. The alignment score for a pair of words can be defined as the average of posterior probabilities of alignment links in both directions. At reference numeral 830, scores are generated with respect to the correspondence set as a function of scores of pairs. At numeral 840, a check is performed to determine whether or not there are more correspondence sets to evaluate. If there are more sets ("YES"), the method loops back to 810 for further processing. If there are no more correspondence sets to evaluate ("NO"), the method continues at reference numeral 850, where a score for a complete set of correspondence sets, or in other words a global alignment score, is computed as a function of correspondence set scores.

Figure 9:
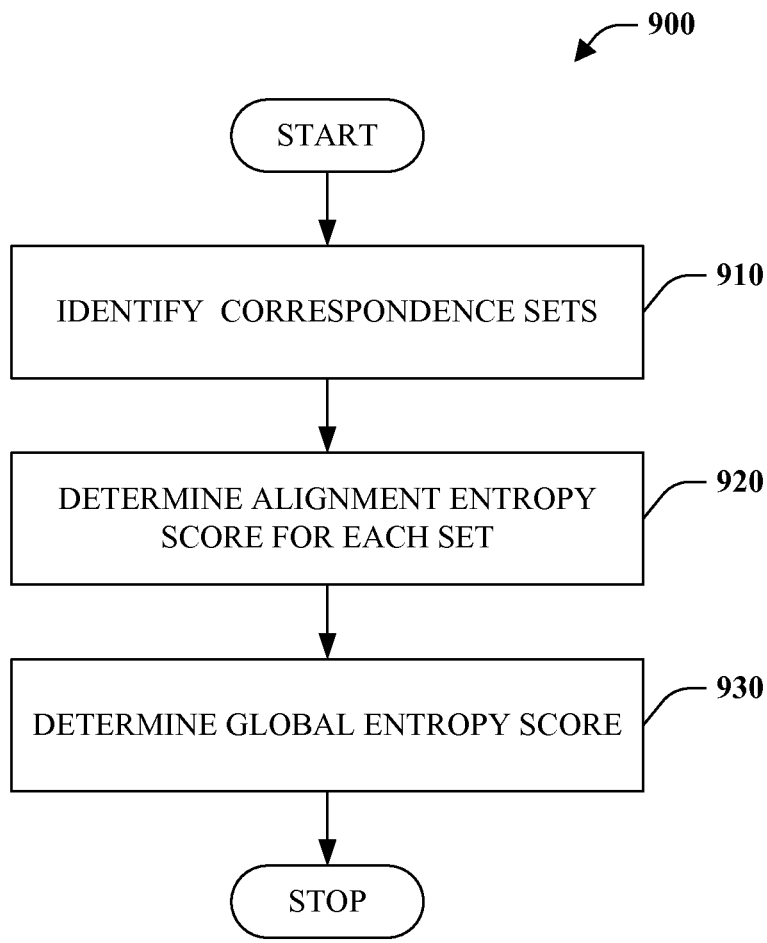
FIG. 9 is a flow chart diagram of a method of modeling alignment entropy.

FIG. 9 is a flow chart diagram of a method of modeling alignment entropy 900. At reference numeral 910, correspondence sets are identified. At numeral 920, an entropy score is determined for each correspondence set. The entropy score can be computed as a function of the number of distinct words in a correspondence set. At reference numeral 930, an overall or global entropy score can be computed as a function of entropy scores associated with the identified correspondence sets.

Figure 10:
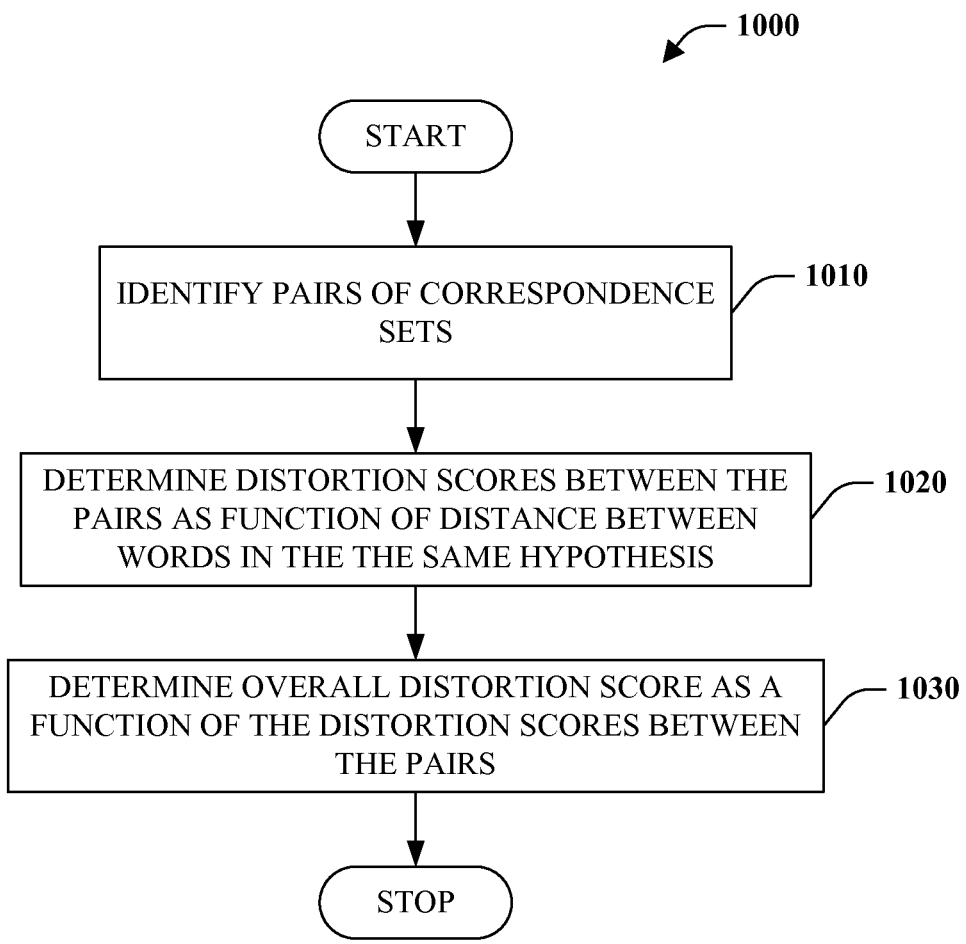
FIG. 10 is a flow chart diagram of a method of modeling distortion.

FIG. 10 is a flow chart diagram of a method of modeling distortion 1000. At reference numeral 1010, pairs of correspondence sets are identified or otherwise obtained or acquired. At numeral 1020, a distortion score is determined between each pair of correspondence sets as a function of distance between words of the same hypothesis. At reference numeral 1030, an overall or global ordering score can be computed as a function of the distortion scores between the pairs.

The subject joint decoding approach for combined machine translation differs from a variety of other approaches in a number of ways. Below is a description of but a few distinguishing features. Of course, the following discussion is meant solely to aid clarity and understanding with respect aspects of the disclosure and is not intended to limit impliedly or implicitly the claimed subject matter.

In confusion network based approaches that use pair-wise (or incremental) word-level alignment algorithms for correspondence set construction, problems with respect to resolving many-to-many alignments and handling multiple insertions and deletions, among other things, need to be addressed. A number of heuristics can be employed to deal with these problems. Further, decisions can be made in a more principled fashion by computing model-based scores, but still special purpose algorithms and heuristics are needed and a single alignment is fixed.

By contrast, the subject approach need not employ heuristics to resolve alignments and no concept of a backbone is used to fix alignment. Instead, the globally highest scoring combination of alignment, order, and selection is utilized.

Other non-confusion-network-based approaches can perform more flexible system combination without the limitation of a single backbone hypothesis. However, the subject approach is based on a joint scoring model that is even more flexible than the other non-confusion-network-based approaches in that it can take into account alignment uncertainty and combine information from word-level alignment models, ordering, and selection models to address three sub-problems of word-level system combination. Further yet, various features are incorporated that measure alignment confidence by way of word-level alignment models and evaluate order by way of distortion models with respect to original hypotheses.

As used herein, the terms "component" and "system" as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

The term "selection" generally refers to the process of selecting, choosing, or identifying a word from an ordered correspondence set, wherein a final output is comprised of selection of a word (including an empty word) from each of a plurality of correspondence sets. "Lexical selection" is a term that refers to choosing a target lexical item, which most closely carries the same meaning as a corresponding item in a source text. In other words, lexical selection is utilized in the context of translating between multiple languages. With system combination, the lexical selection has already occurred once with respect to each translation system and the choice is between words in a single language. Accordingly, the term "selection" is used herein. However, when used within the context of system combination "lexical selection" is synonymous with "selection," as defined above.

The term "ordering" is used herein to refer to the ordering or arrangement of correspondence sets. Further, flexible ordering is allowed meaning generally that the order of correspondence set is not fixed or dictated by the order of words of one or more input hypotheses, as is the convention with respect to confusion networks. Such flexible ordering can also be referred to as "re-ordering" for example when considered with respect to the order of words in the input hypotheses.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Still further yet, to facilitate clarity and understanding, real-world exemplary input hypotheses were often utilized herein rather than abstractions thereof, and trademark symbols were not utilized where they are otherwise applicable. For example, "Jeep" is a registered trademark of the Daimler Chrysler Corporation with respect to automobiles.

Figure 11:
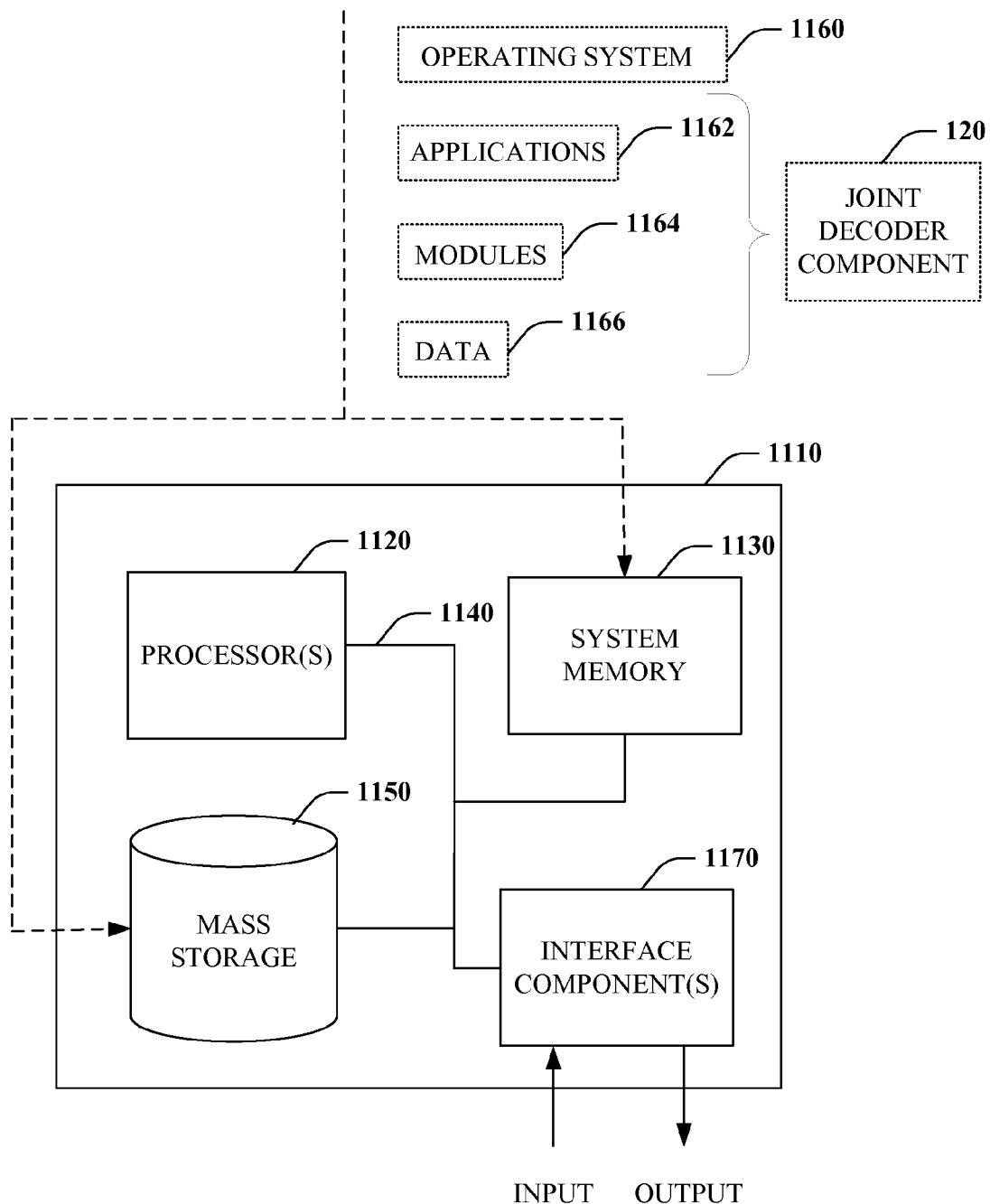
FIG. 11 is a schematic block diagram illustrating a suitable operating environment for aspects of the subject disclosure.

In order to provide a context for the claimed subject matter, FIG. 11 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 11, illustrated is an example computer or computing device 1110 (e.g., desktop, laptop, server, hand-held, programmable consumer or industrial electronics, set-top box, game system . . . ). The computer 1110 includes one or more processor(s) 1120, system memory 1130, system bus 1140, mass storage 1150, and one or more interface components 1170. The system bus 1140 communicatively couples at least the above system components. However, it is to be appreciated that in its simplest form the computer 1110 can include one or more processors 1120 coupled to system memory 1130 that execute various computer executable actions, instructions, and or components.

The processor(s) 1120 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1120 may also be implemented as a combination of computing devices, for example a combination of a DSP and a microprocessor, a plurality of microprocessors, multi-core processors, one or more microprocessors in conjunction with a DSP core, or any other such configuration.

The computer 1110 can include or otherwise interact with a variety of computer-readable media to facilitate control of the computer 1110 to implement one or more aspects of the claimed subject matter. The computer-readable media can be any available media that can be accessed by the computer 1110 and includes volatile and nonvolatile media and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

System memory 1130 and mass storage 1150 are examples of computer-readable storage media. Depending on the exact configuration and type of computing device, system memory 1130 may be volatile (e.g., RAM), non-volatile (e.g., ROM, flash memory . . . ) or some combination of the two. By way of example, the basic input/output system (BIOS), including basic routines to transfer information between elements within the computer 1110, such as during start-up, can be stored in nonvolatile memory, while volatile memory can act as external cache memory to facilitate processing by the processor(s) 1120, among other things.

Mass storage 1150 includes removable/non-removable, volatile/non-volatile computer storage media for storage of large amounts of data relative to the system memory 1130. For example, mass storage 1150 includes, but is not limited to, one or more devices such as a magnetic or optical disk drive, floppy disk drive, flash memory, solid-state drive, or memory stick.

System memory 1130 and mass storage 1150 can include or have stored therein operating system 1160, one or more applications 1162, one or more program modules 1164, and data 1166. The operating system 1160 acts to control and allocate resources of the computer 1110. Applications 1162 include one or both of system and application software and can leverage management of resources by the operating system 1160 through program modules 1164 and data 1166 stored in system memory 1130 and/or mass storage 1150 to perform one or more actions. Accordingly, applications 1162 can turn a general-purpose computer 1110 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the joint decoder component 120 can be an application 1162 or part of an application 1162 and include one or more modules 1164 and data 1166 stored in memory and/or mass storage 1150 whose functionality can be realized when executed by one or more processor(s) 1120, as shown.

The computer 1110 also includes one or more interface components 1170 that are communicatively coupled to the system bus 1140 and facilitate interaction with the computer 1110. By way of example, the interface component 1170 can be a port (e.g., serial, parallel, PCMCIA, USB, FireWire . . . ) or an interface card (e.g., sound, video . . . ) or the like. In one example implementation, the interface component 1170 can be embodied as a user input/output interface to enable a user to enter commands and information into the computer 1110 through one or more input devices (e.g., pointing device such as a mouse, trackball, stylus, touch pad, keyboard, microphone, joystick, game pad, satellite dish, scanner, camera, other computer . . . ). In another example implementation, the interface component 1170 can be embodied as an output peripheral interface to supply output to displays (e.g., CRT, LCD, plasma . . . ), speakers, printers, and/or other computers, among other things. Still further yet, the interface component 1170 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of machine translation, comprising:
  employing at least one processor configured to execute computer-executable instructions stored in memory to perform the following act:
    generating a translation for a sentence by determining word alignment, order, and selection jointly, rather than independently and incrementally, from output of multiple machine translation systems.

2. The method of claim 1, determining the word alignment, order, and selection jointly to maximize a scoring function, comprising a set of feature functions, over a combination of alignment, order, and selection.

3. The method of claim 1 further comprising generating the translation as a function of position dependent single word scoring.

4. The method of claim 1 further comprising generating the translation as a function of position independent n-gram scoring.

5. The method of claim 1 further comprising generating the translation as a function of distortion scoring between the output of multiple machine translation systems and correspondence set order.

6. The method of claim 1 further comprising generating the translation as a function of an alignment score derived from an indirect hidden Markov model (IHMM).

7. The method of claim 1 further comprising generating the translation as a function of alignment entropy.

8. The method of claim 1 further comprising pruning at least one of alignment, order, or selection spaces.

9. A machine translation system for system combination, comprising:
  a memory; and
  a processor, the processor is coupled to the memory and configured to execute the following computer-executable stored in the memory to translate a sentence:
    a first component configured to align, order, and select words from hypotheses, from multiple machine translation systems, in combination, rather than independently and incrementally, to maximize a scoring function, comprising a set of feature functions, over a combination of alignment, order, and selection.

10. The system of claim 9, the set of feature functions comprising a feature function that measures hypothesis alignment with an indirect hidden Markov model (IHMM) for pairs of the hypotheses.

11. The system of claim 9, the set of feature functions comprising a feature function that measures purity of a correspondence set derived from the hypotheses.

12. The system of claim 9, the set of feature functions comprising a feature function that measures consistency between correspondence sets derived from the hypotheses.

13. The system of claim 9, the set of feature functions comprising a feature function that measures position dependent word confidence of words in a correspondence set derived from the hypotheses.

14. The system of claim 9, the set of feature functions comprising a feature function that measures position independent word confidence of words in a correspondence set derived from the hypotheses.

15. The system of claim 9 further comprising a second component configured to reduce a decoding space comprising a product of alignment, ordering, and selection spaces.

16. The system of claim 15 further comprising a third component configured to compute an estimated score for an unvisited portion of the decoding space.

17. A computer-readable storage device having instructions stored thereon that enable at least one processor to perform a method upon execution of the instructions, the method comprising:
  determining a translation as a function of a set of hypotheses from multiple machine translation systems, word alignment, order, and selection decisions are performed jointly, rather than independently and incrementally, based on a highest scoring combination of alignment, order, and selection according to a set of feature functions combined in a log-linear model; and
  outputting the translation.

18. The computer-readable storage device of claim 17, the method further comprising computing an alignment score of a correspondence set as a function of alignment scores of word pairs in the correspondence set.

19. The computer-readable storage device of claim 18, the method further comprising computing an alignment score for consistency of words in the correspondence set.

20. The computer-readable storage device of claim 19, the method further comprising determining an ordering score of distortions between words in pairs of correspondence sets.

* * * * *